Patented Oct. 29, 1935

2,018,916

UNITED STATES PATENT OFFICE 2,018,916

STERILIZING LIQUIDS

Georg Alexander Krause, Munich, Germany, assignor to Katadyn, Inc., Dover, Del., a corporation of Delaware No Drawing. Application October 11, 1930, Serial No. 488,190. In Germany October 12, 1929

7 Claims. (Cl. 99—15)

This invention relates to a process of sterilizing liquids.

Processes in which liquids are sterilized with the aid of gases having a sterilizing action, particularly with chlorine and ozone, have been known for a long time. When employing the correct amounts and maintaining definite conditions, the results are satisfactory, especially with respect to the shortness of the period necessary for sterilization. However these processes have definite inherent defects; thus the gases must be added to the liquid in accurately proportioned quantities, for which purpose analyses are often necessary. It is also necessary in order to obtain a satisfactory result, to employ a small excess of the gases over and above that required by the analysis. Thus chlorine is employed in amounts up to 0.3 gram per cubic metre and ozone in amounts up to 5 grams per cubic metre. Too great an excess of chlorine must be avoided, as the water would otherwise possess a definite flavour of chlorine and would become unpalatable. An excess of ozone is not so objectionable in this respect but makes the sterilization more expensive since the sterilization by ozone is in itself so dear that it can scarcely compete with the chlorine process, so that unnecessary consumption of ozone must be avoided solely for economic reasons. A recent chlorination process, the Adler maximum chlorination process, employs additions of chlorine up to 5 grams per cubic metre, but this large excess of chlorine is again extracted in any case by means of active carbon. In this case there is in the first case a useless consumption of chlorine and in the second case the danger exists that should the active carbon fail to act, objectionably large quantities of chlorine would gain access to the pure water.

The oligodynamic sterilization of liquids with the aid of difficultly soluble or insoluble metals and metallic salts is also known on the other hand. This process has the great advantage that scarcely any or only imperceptible amounts of foreign substances are added to the liquid and that no mechanical or operative attendance is necessary, since any proportioning or measuring apparatus is dispensed with. A certain drawback of this process consists in the necessity for leaving the liquid to be sterilized for a prolonged period in contact with the effective surfaces, or at least to give the liquid after it has passed over the said surfaces a definite after-sterilization period before it is ready for use, since the oligodynamic sterilizing effect is in no way instantaneous.

It has now been found in accordance with the present invention that both of the hereinbefore described types of processes can be combined to form a novel and useful sterilization process which does not exhibit the drawbacks of the individual processes. Thus for example it is possible to incorporate with the liquid to be sterilized, which requires in the ordinary way up to 0.2 gram per cubic metre of chlorine (determined analytically), only a fraction of this quantity of chlorine, for example, only 0.04 gram, by passing said liquid in addition over surfaces possessing oligodynamic action, for example by passing it over silver or copper filling bodies, and taking precautions to ensure a sufficient period of contact sterilization, or of after sterilization. In this manner the danger of an excess of chlorine is avoided with certainty, inasmuch as very much less chlorine has been added than can be consumed by the oxidizable substances as a whole, whilst the deficiency in sterilizing power has been replaced by oligodynamic treatment. On the other hand when working according to the present process it is not necessary to use such long contact or after sterilization periods as when the liquid is to be sterilized only with the aid of the oligodynamic process, that is to say, without the aid of chlorine or ozone.

It has been shown to be of particular advantage to mix the liquid or portion of same first with the sterilizing gas and then to pass it over the oligodynamic substance. In this case the sterilizing gas has a two-fold effect; in the first place it immediately attacks easily oxidizable substances and the less resistant micro-organisms in the liquid, and in the second place, it acts as an exciter for the oligodynamic process, so that the latter is effective in a much shorter period than is usual. This fact can be explained without going into the correctness of any theoretical considerations, by the assumption that the oligodynamic action is based upon the splitting off of metal ions from the active surfaces. This splitting off of metal ions is then naturally accelerated by the presence of oxidizing gases such as chlorine or ozone.

The nature of the apparatus or system employed for incorporating the sterilizing gas with the liquid is immaterial for the purpose of the present invention. As is known hitherto usually only a portion of the stream of liquid was treated with the gas. Thus for example, a solution of chlorine water was produced which was then mixed with the main stream. According to the new proposals, the gaseous chlorine is allowed to escape in the form of fine bubbles directly in the main stream. It is also immaterial for the purpose of the present invention how the oligodynamic apparatus is set up. Also in this case either a portion or the main stream of the liquid can be passed over the oligodynamic substance and the containers containing the active substance can be shaped, arranged or filled in any desired manner.

I claim:—

1. A process for sterilizing water, which comprises treating the water with an amount of chlorine not exceeding substantially 0.04 gram per cubic meter, and contacting the water with an oligodynamic substance, said chlorine and oligodynamic substance reacting.

2. A process for sterilizing water, which comprises treating the water with an amount of chlorine approximately one-fifth of that ordinarily required for sterilizing purposes, and subsequently contacting the chlorinated water with an oligodynamic substance to bring about a reaction of the chlorine and oligodynamic substance, and a complete sterilization of the water.

3. A process for sterilizing water, which comprises contacting the water with an oxidizing gas in amounts less than that ordinarily required for sterilizing purposes, and subsequently contacting the water with an oligodynamic substance causing an oxidation of the oligodynamic substance and a further sterilization of the water.

4. A process for sterilizing liquids which comprises the primary step of contacting the liquids with a sterilizing gas and the secondary step of subsequently contacting said partially sterilized liquids with an oligodynamically active substance and finally submitting said liquid to a rest period before use whereby the oligodynamic substance may become effective, said sterilizing gas acting as a rapid destroyer of bacteria, and said oligodynamic substance giving a permanent bactericidal power.

5. A process for sterilizing liquids which comprises the primary step of contacting the liquids with a sterilizing gas and the secondary step of contacting the partially sterilized liquids with an oligodynamically active substance, said oligodynamic substance having a complementary and permanent bactericidal effect.

6. A process for sterilizing liquids which comprises the primary step of contacting the liquids with a sterilizing gas of the oxidizing type and subsequently contacting said partially sterilized liquids with an oligodynamically active substance, said oligodynamically active substance reacting with the oxidizing gas to remove surplus and detrimental quantities thereof.

7. A process for sterilizing liquids which comprises the step of contacting the liquid with chlorine to give a bactericidal effect and to remove putrification and subsequently contacting said chlorinated liquid with silver in oligodynamic concentration to further destroy bacteria without deteriorating the liquid as to taste or flavor.

GEORG ALEXANDER KRAUSE.